United States Patent Office 2,809,208
Patented Oct. 8, 1957

2,809,208

PRODUCTION OF DIALKYL ESTERS OF ISOPHTHALIC AND TEREPHTHALIC ACIDS FROM NITRILES

Robert E. Miller and Rudolph Rosenthal, East Lansdowne, Pa., assignors to Allied Chemical & Dye Corporation, New York, N. Y., a corporation of New York No Drawing. Application December 13, 1954, Serial No. 475,009

4 Claims. (Cl. 260—475)

The present invention relates to the preparation of dialkyl esters of isophthalic acid, terephthalic acid or mixtures thereof. More particularly, the present invention relates to the production of high yields of relatively pure dialkyl esters of isophthalic acid, terephthalic acid or mixtures thereof from the corresponding phthalonitriles.

In the past, dialkyl esters of isophthalic acid, terephthalic acid or mixtures thereof have been produced by reacting the corresponding phthalic acids with excess esterifying alcohol and sulfuric acid. When this procedure is employed for conversion of phthalonitriles to the corresponding dialkyl phthalates, relatively low yields of impure ester products are obtained.

An object of the present invention is to provide a process for the production of high yields of relatively pure dialkyl esters of terephthalic acid, isophthalic acid or mixtures thereof.

Another object of the invention is to provide a process for the production of high yields of relatively pure dialkyl esters of terephthalic acid, isophthalic acid or mixtures thereof from the corresponding phthalonitriles.

Other objects and advantages of the invention will be apparent from the following detailed description thereof.

We have now discovered that high yields of relatively pure dialkyl esters of terephthalic acid, isophthalic acid or mixtures thereof may be obtained from phthalonitriles by a two-step reaction which comprises hydrolyzing the phthalonitriles under such conditions as to obtain substantially complete conversion to the corresponding phthalamides and reacting the resultant reaction mass comprising phthalamides with an excess of an esterifying alcohol to produce the desired dialkyl esters.

Although the process of the present invention is suitable generally for the production of dialkyl esters of terephthalic acid, isophthalic acid or mixtures thereof, it will be illustrated hereinafter by the production of dimethyl terephthalate.

In accordance with the first step (hydrolysis) of the invention, a reaction mass comprising terephthalamide is prepared by reacting a mixture of terephthalonitrile, sulfuric acid and water under conditions so as to obtain substantially complete conversion of the nitrile to amide.

In practice of the first step, it is preferred to have an excess of sulfuric acid and of water. Particularly outstanding results have been obtained by use of about 5 to 7 mols of sulfuric acid and about 2 to 4.5 mols of water for every mol of terephthalonitrile reactant.

The mixing of the terephthalonitrile, sulfuric acid and water reactants is conducted at moderate temperature, preferably at a temperature of about 25 to 35° C. Upon mixing, an exothermic reaction occurs, and hence, it is usually found desirable to provide cooling means to control the temperature within the desired range. The resultant mixture is then reacted at a temperature of about 30 to 80° C. until substantially complete conversion of the nitrile to amide is effected.

The time of hydrolysis reaction which gives the best yields of terephthalamide is to some extent dependent upon the particular composition being reacted and is also a function of the temperature to which it is subjected. We have found that satisfactory results are obtained using reaction times in the order of about 3 to 20 hours.

In accordance with the second step (esterification) of the present invention, the reaction mass comprising terephthalamide is reacted at elevated temperature with excess methanol to produce the desired dimethyl terephthalate. The reaction mixture is cooled or allowed to cool to room temperature and is then poured into cold water with stirring. An aqueous suspension of crystalline dimethyl terephthalate forms which is rendered alkaline by the addition with vigorous stirring of a suitable alkali such as sodium carbonate. The dimethyl terephthalate is recovered by filtration, washed with several portions of water and dried. Generally speaking, a dimethyl terephthalate product having a purity of about 95 to 99% is obtained in about 92 to 98 mol percent yield based on the terephthalonitrile fed.

In the second step, it is found desirable to employ the methanol in very large excess over that theoretically required. Generally, excellent results are obtained by use of about 15 to 35 mols of methanol per mol of terephthalonitrile fed.

Although step two can be carried out in conjunction with any other esterifying alcohol in addition to methanol, it is particularly applicable to the production of esters from lower boiling aliphatic alcohols containing 1 to 4 carbon atoms. Methanol, ethanol, propanol-1 and butanol-1 are the preferred esterifying alcohols.

The second step is carried out in the presence of a catalyst such as sulfuric acid. In practice of the present invention, the quantity of sulfuric acid employed in the first step of the process has been found to supply adequate catalyst to effect the esterification reaction. In any case it is desirable to have present during the esterification reaction about 4 to 6 mols of sulfuric acid for every mol of terephthalonitrile fed.

In general, the esterification reaction is conveniently operated at the reflux temperature of the reaction mixture produced by the addition of the esterifying alcohol to the mixture obtained from the hydrolysis step of the process. Suitably, reaction temperatures vary from about 65 to 150° C. If desired, superatmospheric pressure may be employed so that higher temperatures, as up to about 200° C., and hence, faster reaction times may be utilized.

As in the hydrolysis step of the present invention, the time of reaction in the esterification step will be dependent on the particular reaction composition and will also be a function of the temperature to which it is subjected. Excellent results have been obtained using reaction times in the order of 6 to 12 hours.

The following examples, in which parts are by weight, illustrate the invention.

*Example 1.*—A mixture of 1.9 parts of water, 31.4 parts of 95.5% sulfuric acid and 6.7 parts of terephthalonitrile was allowed to stand overnight with occasional stirring at about 30° C. The initial mixture contained water, sulfuric acid and terephthalonitrile, in the proportions of 3.52 mols of water and 5.85 mols of sulfuric acid per mol of terephthalonitrile. The reaction mass comprising terephthalamide was mixed with 42.8 parts of methanol, and the mixture was refluxed for 3 hours at a temperature of approximately 75° C. After this period, 8 parts of additional methanol was added and refluxing was continued for 3¼ hours. The total methanol used was equivalent to 30.4 mols per mol of terephthalonitrile. The resultant reaction mixture was allowed to stand at room temperature overnight. It was then poured into about 1000 parts of cold water (20° C.)

with stirring, and crystalline dimethyl terephthalate remained undissolved. The dimethyl terephthalate reaction product was then rendered alkaline by the addition of solid sodium carbonate. The product was then removed by filtration, washed with several portions of water and dried at 60° C. in vacuo. 9.4 parts of relatively pure dimethyl terephthalate was obtained, which corresponded to a yield of 92.6 mol percent based on the terephthalonitrile fed. The product had a melting point of 141.5–143.5° C., while the reported melting point of pure dimethyl terephthalate is 140° C.

*Example 2.*—A mixture of 2.0 parts of water, 31.0 parts of 95.5% sulfuric acid and 6.3 parts of terephthalonitrile was allowed to stand overnight with occasional stirring at about 30° C. The initial mixture contained water, sulfuric acid and terephthalonitrile, in the proportions of 3.83 mols of water and 6.18 mols of sulfuric acid for every mol of terephthalonitrile. The reaction mass comprising terephthalamide was mixed with 39.7 parts of methanol and was refluxed for 3 hours at approximately 75° C. After this refluxing period, 8.0 parts of additional methanol was added and refluxing was continued for 3 hours. The total methanol employed was equivalent to 30.3 mols per mol of terephthalonitrile. The reaction mixture was allowed to stand overnight at room temperature. It was then chilled, and crystalline dimethyl terephthalate was removed by filtration, washed with water and dried at 60° C. in vacuo. The dimethyl terephthalate product was relatively pure and constituted 9.0 parts which corresponded to a yield of 94.3 mol percent based on the terephthalonitrile fed. The dimethyl terephthalate product had a melting point of 140.5–142.5° C.

*Example 3.*—A mixture of 1.8 parts of water, 32.4 parts of 95.5% sulfuric acid and 6.7 parts of terephthalonitrile was allowed to stand overnight with occasional stirring at about 30° C. The initial mixture contained water, sulfuric acid and terephthalonitrile, in the proportions of 3.48 mols of water and 6.05 mols of sulfuric acid per mol of terephthalonitrile. The reaction mass comprising terephthalamide was mixed with 38.3 parts of methanol and was refluxed for 6 hours at approximately 75° C. The methanol employed was equivalent to 22.9 mols per mol of terephthalonitrile. The resultant heterogeneous reaction mass was allowed to stand overnight. It was then poured with stirring into about 1000 parts of cold water (10° C.), and crystalline dimethyl terephthalate product remained undissolved. The reaction product was rendered alkaline by the addition of a 10% aqueous solution of sodium carbonate. The product was then removed by filtration, washed with several portions of water and dried at 60° C. in vacuo. 9.6 parts of relatively pure dimethyl terephthalate having a melting point of 140–142° C. was obtained. This corresponded to a yield of 94.5 mol percent based on the terephthalonitrile fed.

*Example 4.*—A mixture of 51 parts of water, 895 parts of 95.5% sulfuric acid and 179 parts of terephthalonitrile was allowed to stand overnight with occasional stirring at about 30° C. The original mixture contained water, sulfuric acid and terephthalonitrile, in the proportions of 3.6 mols of water and 6.24 mols of sulfuric acid per mol of terephthalonitrile. The reaction mass comprising terephthalamide was then mixed with 1035 parts of methanol and was refluxed for 6 hours at approximately 75° C. The amount of methanol used was equivalent to 23.1 mols per mol of terephthalonitrile. The resultant heterogeneous reaction mass was allowed to stand overnight at room temperature, and crystalline dimethyl terephthalate product was removed by filtration. The ester product was then suspended in 2000 parts of water, and the suspension was rendered alkaline by the addition of a 10% aqueous sodium carbonate solution and again filtered. The dimethyl terephthalate product was washed with several portions of water and dried at 60° C. in vacuo. The product was substantially pure dimethyl terephthalate having a melting point of 140.8–142.8° C. and constituted 256 parts which corresponded to a yield of 94.5 mol percent based on the terephthalonitrile fed.

The following example shows that when terephthalonitrile is allowed to react with excess methanol and sulfuric acid, dimethyl terephthalate is obtained as impure product and in substantially lower yields than in those cases where the nitrile is first converted to the corresponding amide.

*Example 5.*—A mixture of 2.0 parts of water, 32.1 parts of 95.5% sulfuric acid, 38.9 parts of methanol and 6.3 parts of terephthalonitrile was refluxed for 4 hours at a temperature of approximately 75° C. The initial mixture contained water, sulfuric acid, methanol and terephthalonitrile, in the proportions of 3.89 mols of water, 6.36 mols of sulfuric acid and 24.7 mols of methanol per mol of terephthalonitrile. After the initial refluxing period, 7.9 parts of additional methanol was added to the reaction mixture, and refluxing was continued for 2 hours. The total amount of methanol used was equivalent to about 29.7 mols per mol of terephthalonitrile. The reaction mass was allowed to stand overnight at room temperature. It was then poured with stirring into about 1000 parts of cold water (10° C.), and crystalline dimethyl terephthalate remained undissolved. The reaction product was then rendered alkaline by addition of a 10% aqueous solution of sodium carbonate. The product was removed by filtration and was then washed with several portions of water and dried at 60° C. in vacuo. 5.7 parts of dimethyl terephthalate, corresponding to a yield of 59.7 mol percent based on the terephthalonitrile fed, was obtained. The dimethyl terephthalate product was quite impure since it evolved ammonia when heated in aqueous alkali, and, although it began to melt at 115° C., it had still not completely melted by 150° C.

Dialkyl phthalates such as dimethyl terephthalates are important commercial chemicals finding use in the manufacture of synthetic fibers, films, photographic film bases and resins.

While we have described the preferred embodiments for carrying out the process of our invention, it will be apparent that many changes may be made without departing from the spirit of the invention.

We claim:

1. A process for preparing dialkyl phthalates which comprises reacting a member of the group consisting of terephthalonitrile, isophthalonitrile and mixtures thereof with an excess of sulfuric acid and an excess of water at a temperature of about 30 to 80° C., thereby forming a reaction mass comprising the corresponding phthalamide, and reacting said reaction mass with an excess of an esterifying alcohol at a temperature of about 65 to 200° C.

2. A process for preparing dialkyl phthalates which comprises reacting a member of the group consisting of terephthalonitrile, isophthalonitrile and mixtures thereof with sulfuric acid and water, in the proportions of about 5 to 7 mols of acid and over 2 up to 4.5 mols of water for each mol of nitrile, at a temperature of about 30 to 80° C., thereby forming a reaction mass comprising the corresponding phthalamide, and reacting said reaction mass with an esterifying alcohol, in the proportions of about 15 to 35 mols of alcohol for every mol of nitrile, at a temperature of about 65 to 200° C.

3. A process for preparing dialkyl terephthalates which comprises reacting terephthalonitrile with sulfuric acid and water, in the proportions of about 5 to 7 mols of acid and over 2 up to 4.5 mols of water for every mol of terephthalonitrile, at a temperature of about 30 to 80° C., thereby forming a reaction mass comprising terephthalamide, and reacting said reaction mass with an esterifying alcohol, in the proportions of about 15 to 35 mols of alcohol for every mol of terephthalonitrile, at a temperature of about 65 to 200° C.

4. A process for preparing dimethyl terephthalate which comprises reacting terephthalonitrile with sulfuric acid and water, in the proportions of about 5 to 7 mols of acid and over 2 up to 4.5 mols of water for every mol of terephthalonitrile, at a temperature of about 30 to 80° C., thereby forming a reaction mass comprising terephthalamide, and reacting said reaction mass with methanol, in the proportions of about 15 to 35 mols of methanol for every mol of terephthalonitrile, at a temperature of about 65 to 150° C.

References Cited in the file of this patent

UNITED STATES PATENTS

| | | |
|---|---|---|
| 1,584,907 | Trusler | May 18, 1926 |
| 2,195,076 | Braun et al. | Mar. 26, 1940 |

FOREIGN PATENTS

| | | |
|---|---|---|
| 592,106 | Great Britain | Sept. 8, 1947 |

OTHER REFERENCES

Groggins: "Unit Processes in Organic Synthesis," 1952 (pp. 620–1).